US009229108B2

(12) United States Patent
Debrunner et al.

(10) Patent No.: US 9,229,108 B2
(45) Date of Patent: Jan. 5, 2016

(54) UNDERWATER PLATFORM WITH LIDAR AND RELATED METHODS

(71) Applicant: LOCKHEED MARTIN CORPORATION, Bethesda, MD (US)

(72) Inventors: Christian H. Debrunner, Conifer, CO (US); Alan K. Fettinger, Highlands Ranch, CO (US); Philip A. Bouxsein, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/245,522

(22) Filed: Apr. 4, 2014

(65) Prior Publication Data

US 2014/0300885 A1 Oct. 9, 2014

Related U.S. Application Data

(60) Provisional application No. 61/808,994, filed on Apr. 5, 2013.

(51) Int. Cl.
*G01S 17/89* (2006.01)
*G01S 17/42* (2006.01)
(Continued)

(52) U.S. Cl.
CPC . *G01S 17/89* (2013.01); *B63B 1/00* (2013.01); *G01C 13/008* (2013.01);
(Continued)

(58) Field of Classification Search
CPC ...... B63C 11/48; G01B 11/24; G01S 7/4813; G01S 7/497; G01C 3/08
USPC ............. 356/3.01–3.15, 4.01–4.1, 5.01–5.15, 356/6–22, 28, 28.5
See application file for complete search history.

(56) References Cited

U.S. PATENT DOCUMENTS

| 6,590,640 B1 | 7/2003 | Aiken et al. |
| 2005/0007448 A1 | 1/2005 | Kattenbacher et al. |

(Continued)

FOREIGN PATENT DOCUMENTS

| WO | 2012/061069 | 5/2012 |
| WO | 2012/061097 | 5/2012 |

(Continued)

OTHER PUBLICATIONS

J. S. Jaffe, "Development of a Laser Line Scan LIDAR Imaging System for AUV Use," found online at www.dtic.mil/cgi-bin/GeTRDoc?AD=ADA541242, believed to be published in 2010 (5 pages).

(Continued)

*Primary Examiner* — Luke Ratcliffe
(74) *Attorney, Agent, or Firm* — Hamre, Schumann, Mueller & Larson, P.C.

(57) ABSTRACT

Systems and methods for conducting autonomous underwater inspections of subsea and other underwater structures using a 3D laser mounted on an underwater platform such as AUV, an ROV or a tripod. The systems and methods described herein can be used for scanning underwater structures to gain a better understanding of the underwater structures, such as for example, for the purpose of generating a 3D virtual model of the underwater structure. The 3D virtual model can be used for many purposes including, but not limited to, directing inspection, repair, and manipulation of the underwater structure, navigating around the underwater structure, and other purposes.

13 Claims, 16 Drawing Sheets

(51) Int. Cl.
G01S 7/48 (2006.01)
G01C 13/00 (2006.01)
G06T 7/00 (2006.01)
B63B 1/00 (2006.01)

(52) U.S. Cl.
CPC .............. *G01S 7/4808* (2013.01); *G01S 17/42* (2013.01); *G06T 7/0057* (2013.01); *G06T 7/0065* (2013.01); *G06T 2207/30108* (2013.01)

(56) References Cited

U.S. PATENT DOCUMENTS

| | | | |
|---|---|---|---|
| 2006/0221349 A1* | 10/2006 | Que et al. | 356/601 |
| 2010/0238269 A1 | 9/2010 | Mirallés et al. | |
| 2012/0044476 A1 | 2/2012 | Earhart et al. | |
| 2012/0062963 A1* | 3/2012 | Gillham et al. | 358/474 |
| 2012/0099395 A1 | 4/2012 | Debrunner et al. | |
| 2012/0099402 A1* | 4/2012 | Debrunner et al. | 367/134 |

FOREIGN PATENT DOCUMENTS

| | | |
|---|---|---|
| WO | 2012/061099 | 5/2012 |
| WO | 2012/061134 | 5/2012 |
| WO | 2012/061135 | 5/2012 |
| WO | 2012/061137 | 5/2012 |

OTHER PUBLICATIONS

C. Embry, "High Resolution 3D Laser Imaging for Inspection, Maintenance, Repair, and Operations," RPSEA Phase 1 Final Report, found online at http://www.rpsea.org/media/files/project/2fe78ba2/09121-3300-06-FR-Phase_1_High_Resolution_3D_Laser_Imaging-03-13-12_P.pdf, published Mar. 9, 2012 (48 pages).

International Search Report for international application No. PCT/US2014/033010, dated Jul. 28, 2014 (3 pages).

Written Opinion for international application No. PCT/US2014/033010, dated Jul. 28, 2014 (4 pages).

U.S. Appl. No. 14/245,368, filed Apr. 4, 2014 (47 pages).

* cited by examiner

UNDERWATER PLATFORM WITH LIDAR AND RELATED METHODS

FIELD

This disclosure relates to the use of LIDAR on an underwater platform to conduct inspections of subsea and other underwater structures. Data resulting from the LIDAR can be used for a number of purposes including, but not limited to, generating three-dimensional (3D) virtual models of the underwater structure.

BACKGROUND

Systems and methods that employ 3D sonar on an underwater vehicle to conduct inspections of subsea and other underwater structures is known from WO 2012/061069, WO 2012/061097, WO 2012/061099, WO 2012/061137, WO 2012/061135, and WO 2012/061134, each of which is incorporated herein by reference in their entirety. In WO 2012/061137, data resulting from the 3D sonar is used to generate a 3D virtual model of the underwater structure.

SUMMARY

This disclosure relates to systems and methods for conducting inspections of subsea and other underwater structures using a 3D laser. In particular, systems and methods are described that relate to autonomous underwater inspections using a 3D laser, i.e. Light Detection and Ranging (or LIDAR), also referred to as Laser Detection and Ranging (or LADAR). The terms LIDAR, LADAR and 3D laser (or the like) as used throughout this disclosure are intended to be synonymous with one another.

The systems and methods described herein are carried out using a suitable underwater platform such as an underwater vehicle including, but not limited to, an autonomous underwater vehicle (AUV), a remotely operated vehicles (ROVs), or a diver operated apparatus, or other underwater platform such as a tripod. So although the description below may refer specifically to an AUV, the systems and methods described herein can be employed using other types of underwater platforms, whether fixed or stationary. As used herein, an ROV is a remotely operated underwater vehicle that can be tethered by a cable to a host, such as a surface ship. The ROV is unoccupied and is operated by a pilot aboard the host. The tether can carry, for example, electrical power (in place of or to supplement battery power on the self-contained system), video and data signals back and forth between the host and the ROV. As used herein, an AUV is an autonomous underwater vehicle that is unmanned and is not tethered to a host vessel.

The systems and methods described herein can be used for scanning underwater structures to gain a better understanding of the underwater structures, such as for example, for the purpose of generating a 3D virtual model of the underwater structure. The 3D virtual model can be used for many purposes including, but not limited to, directing inspection, repair, and manipulation of the underwater structure, navigating around the underwater structure, and other purposes.

The described systems and methods can be used to scan any type of underwater structure. For example, underwater structures include man-made objects, such as offshore oil platform support structures and piers and oil-well related equipment, as well as natural objects such as underwater mountain ranges, and can include structures that are wholly or partially underwater. Underwater structure can also include both stationary and non-stationary structures, for example that may experience drift in the underwater environment. More generally, underwater structure is meant to encompass any arbitrary three dimensional structure with depth variation and that may have varying complexity.

As used herein, the term underwater includes any type of underwater environment in which an underwater structure may be located and may need to be scanned using the systems and methods described herein, including, but not limited to, salt-water locations such as seas and oceans, and freshwater locations.

In one embodiment, a method of building a 3D virtual model of an underwater structure includes directing one or more laser beam pulses from a 3D laser mounted on an underwater platform toward the underwater structure and detecting light that is reflected from the underwater structure. A data point cloud is obtained from the detected reflected light, with the data point cloud being processed to provide a three-dimensional virtual model of the portion of the underwater structure. An alignment model of the underwater structure is generated based from the data point cloud obtained. Another laser beam pulse is directed toward the underwater structure and a new data point cloud obtained. A sample of the new data point cloud obtained is aligned to the alignment model, and a 3D virtual model of the underwater structure is constructed using at least one of the data point clouds. When the new data point cloud is obtained, a processor is configured to obtain the new data point cloud from a data storage. The processor is configured to align the new data point cloud obtained to the alignment model, and to add the aligned data point cloud to the alignment model. At the completion of this process, the alignment model represents a 3D virtual model of the underwater structure.

DRAWINGS

Figure 13A:
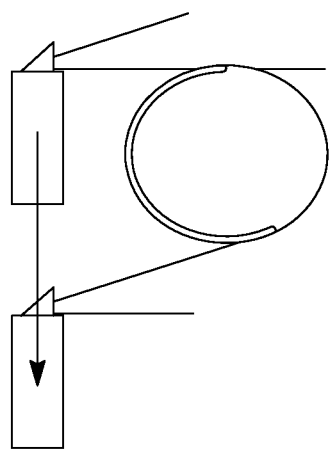
Figure 13C:
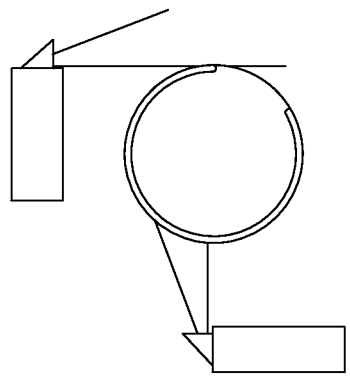
Figure 13B:
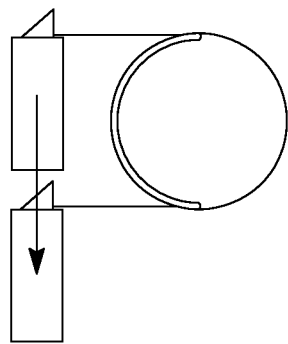

FIGS. 13A-C illustrate coverage of the laser when scanning a tubular object at various azimuths.

Figure 14:
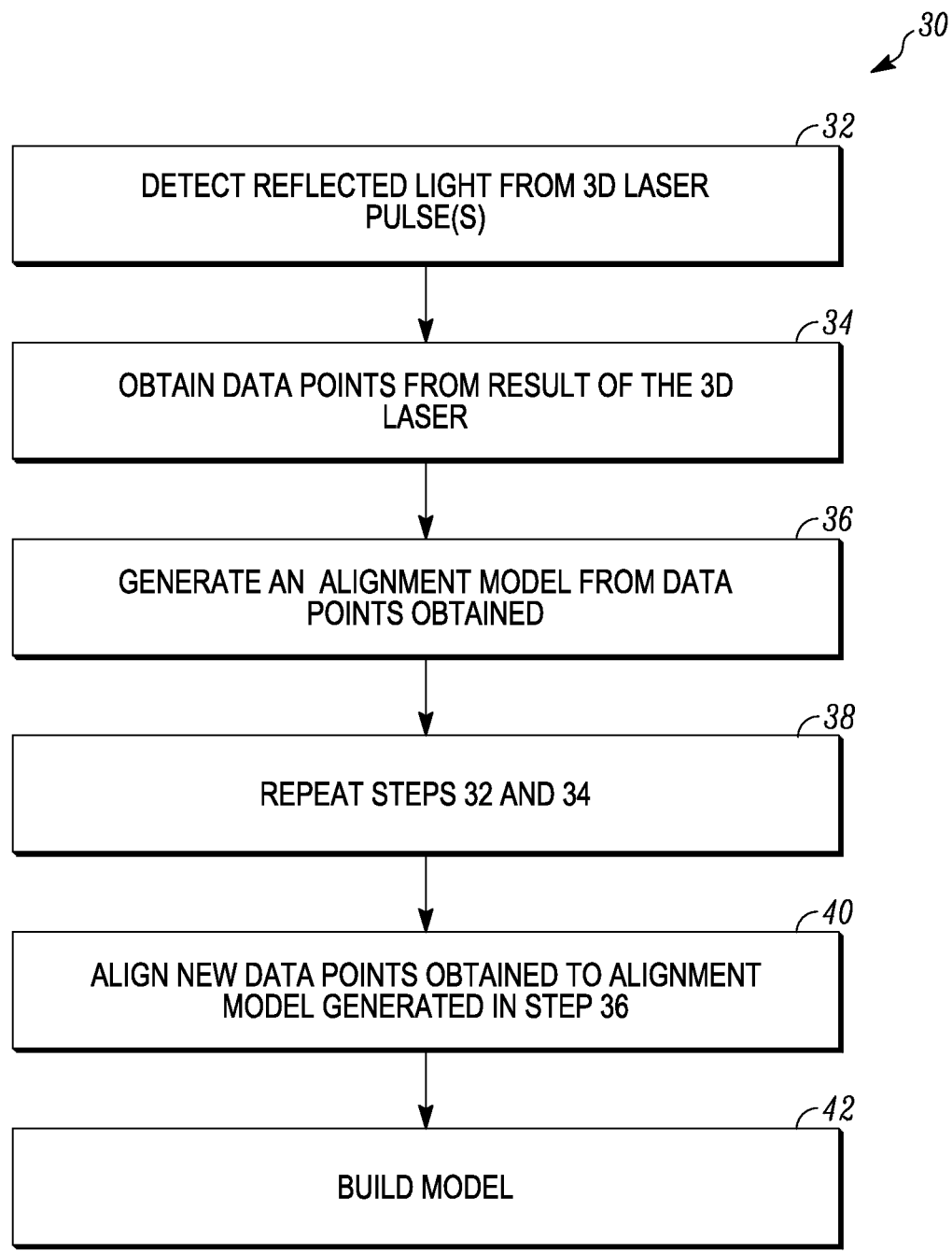

FIG. 14 shows a flow diagram of one embodiment of a method for building a three-dimensional model of an underwater structure.

Figure 15:
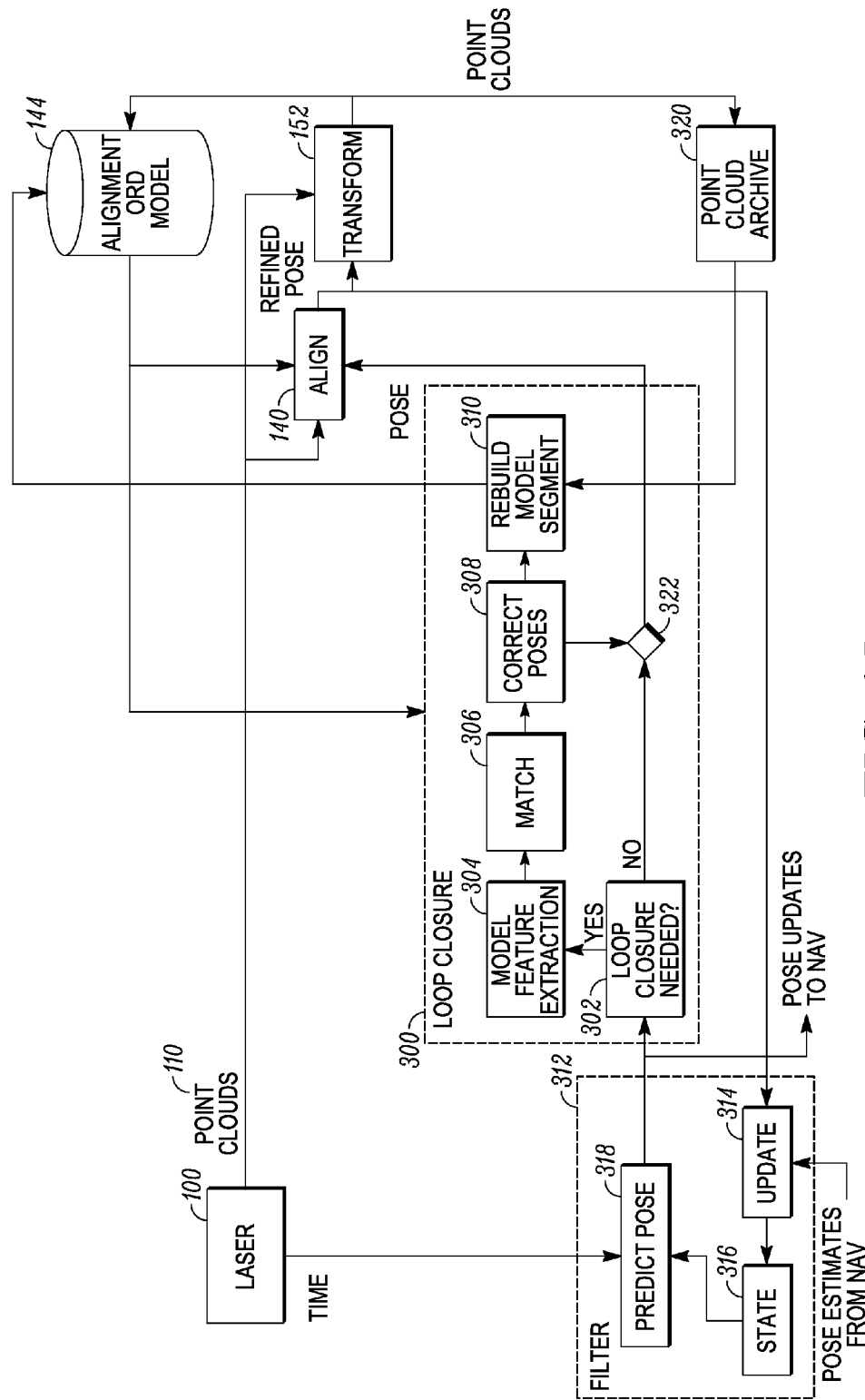

FIG. 15 shows a flow diagram of one embodiment for processing reflected light data and position orientation information for building a 3D virtual model of the underwater structure.

Figure 16:
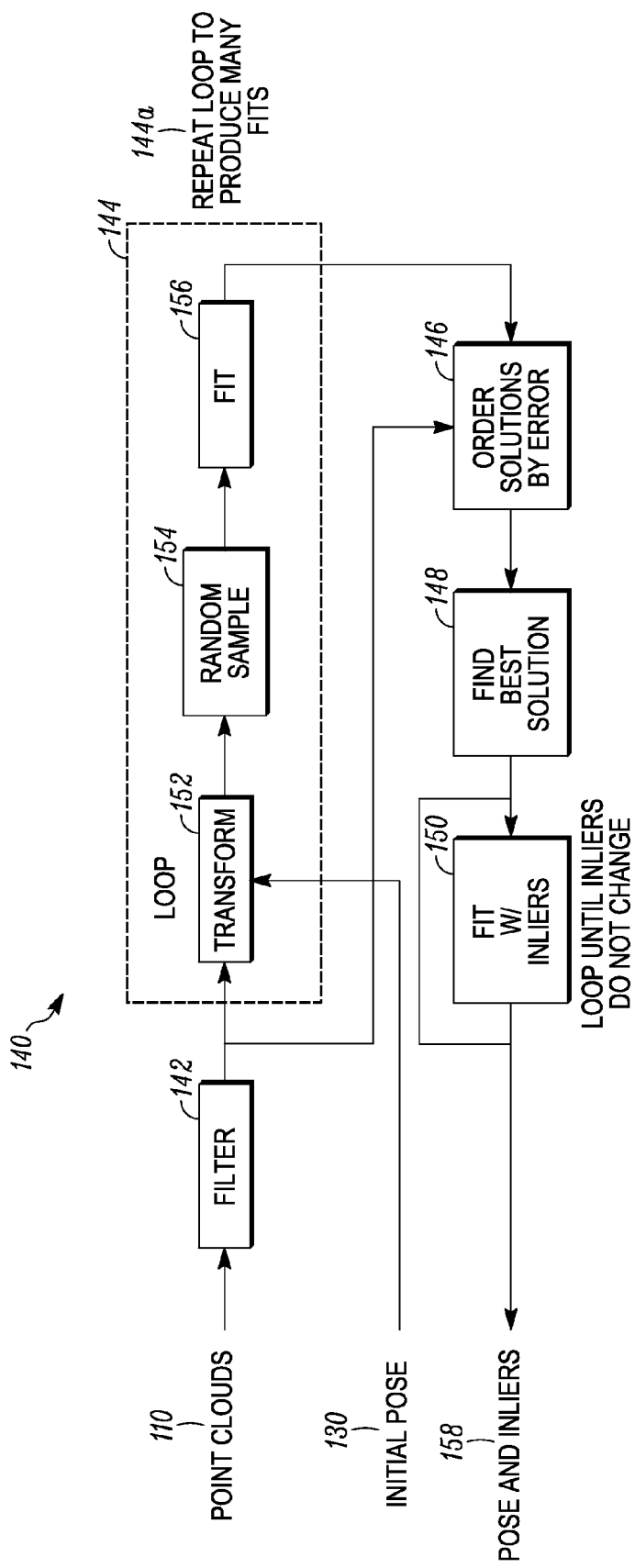

FIG. 16 shows a flow diagram of one embodiment of comparing reflected light data to an alignment model (Alignment Model) of the underwater structure, which may be employed in the method shown in FIG. 14.

Figure 17:
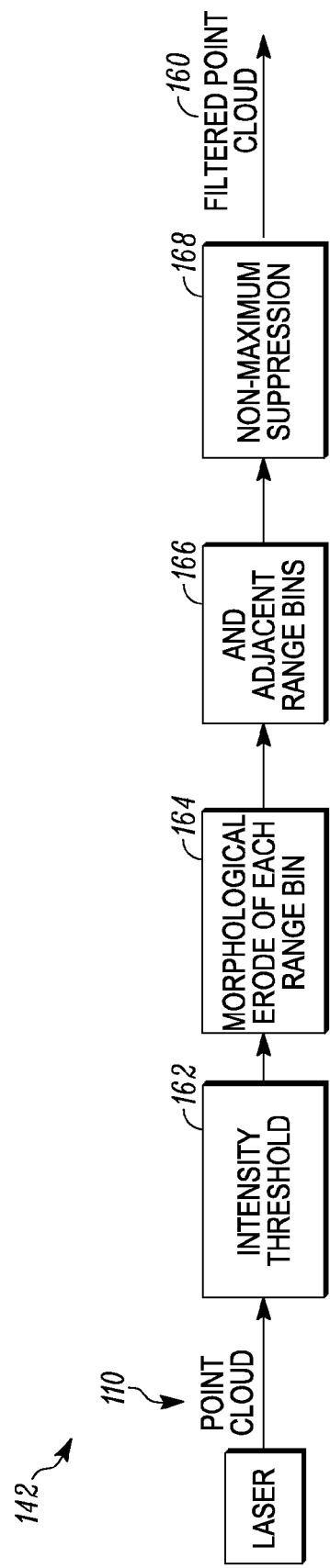

FIG. 17 shows a flow diagram of an exemplary filtering process on the point cloud data obtained from the reflected light which may be employed in the method shown in FIG. 14.

Figure 18:
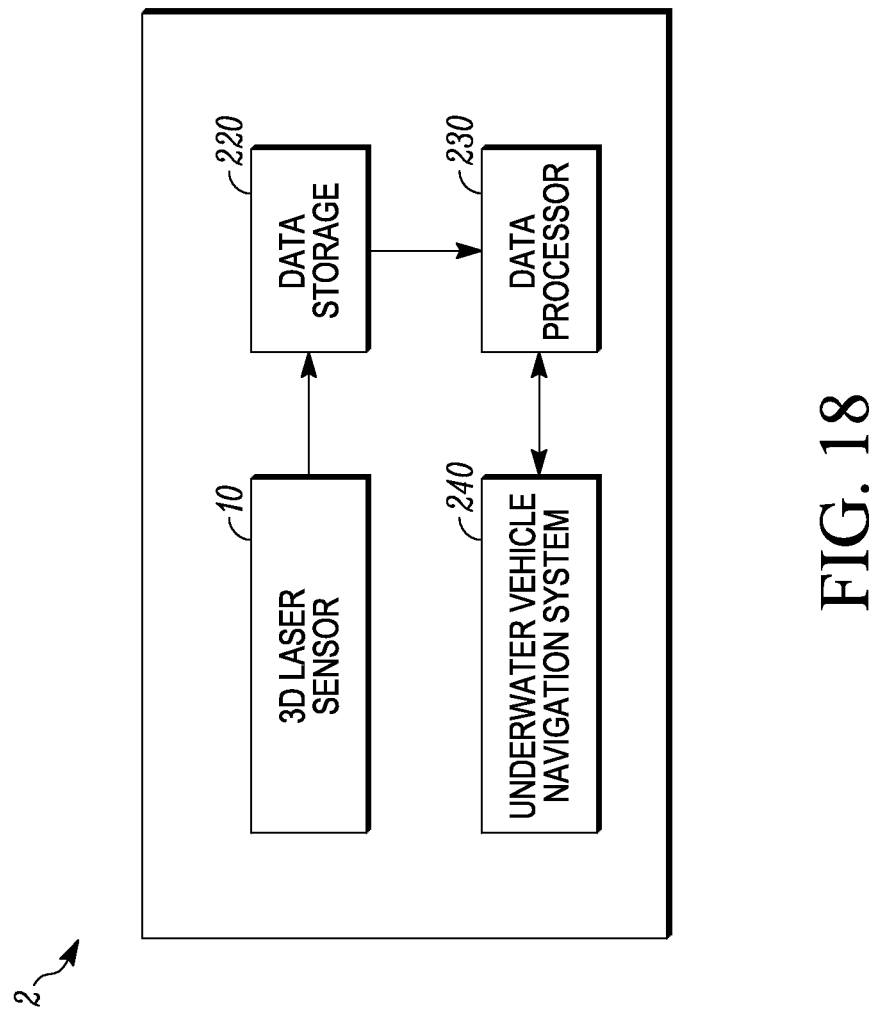

FIG. 18 is a schematic depiction of an AUV with 3D laser.

DETAILED DESCRIPTION

Figure 1:
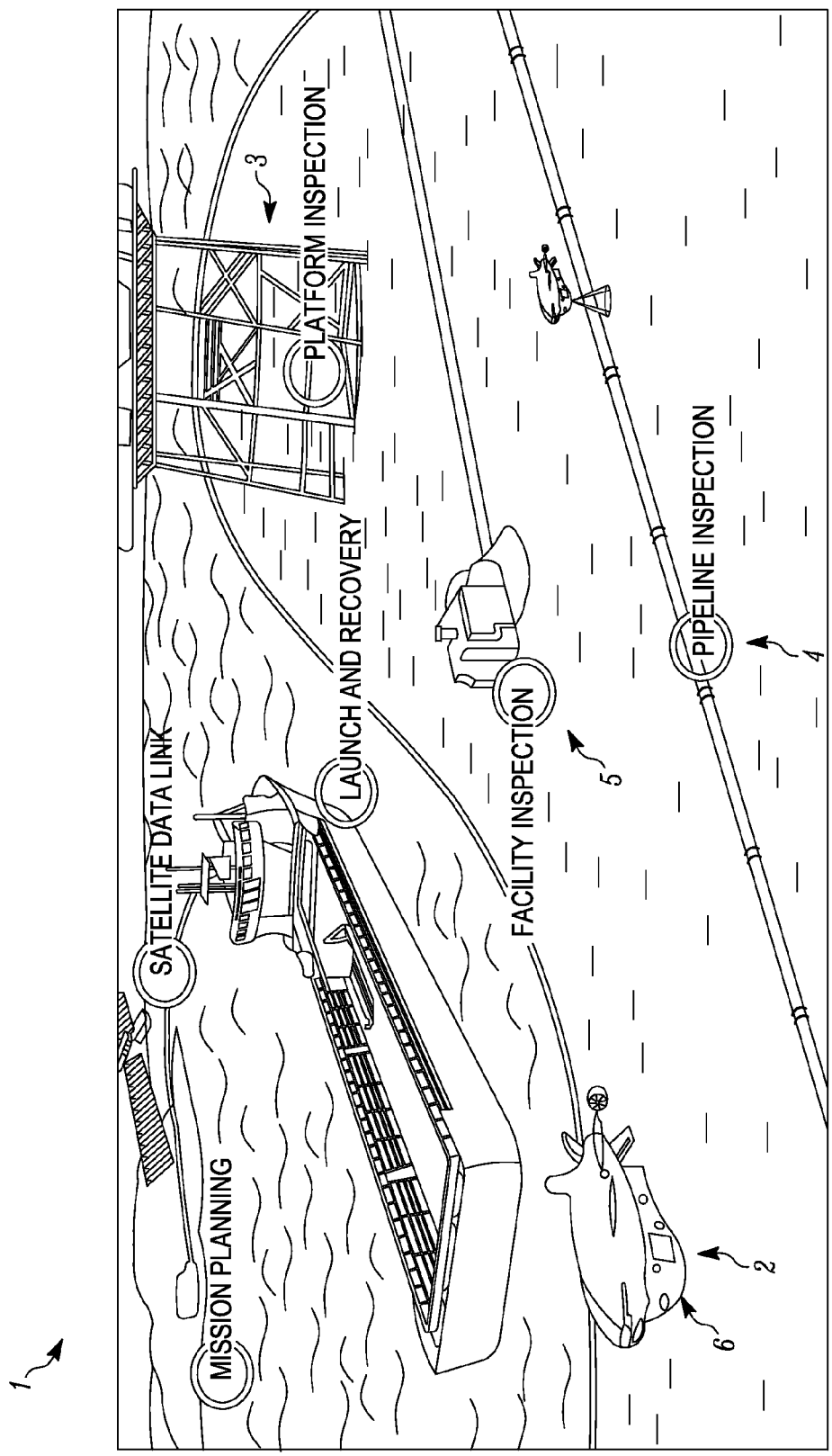
FIG. 1 illustrates an example of an AUV-based 3D laser inspection system described herein.

FIG. 1 illustrates an example of an AUV-based 3D laser inspection system 1 (also referred to as LIDAR or LADAR) where a self-propelled AUV 2 is disposed underneath the water for conducting an inspection of an underwater structure. The construction, operation and use of LADAR systems is well known in the art, including measuring the time between the projection of the laser beam and the detection of the reflection to measure range, and generating 3D virtual models using LADAR. The point clouds discussed further below are generated from the angles and times of the projected laser beam pulses, the times of the detected pulses, and the positions of the sensor reported by the vehicle navigation system.

The AUV 2 can be used to inspect any underwater structure. Examples of underwater structures include, but are not limited to, a platform support structure 3 that comprises a plurality of support legs, an underwater pipeline 4, an underwater facility 5, and other underwater structures. The AUV 2 operations can be supported by a surface ship or other non-underwater vehicle, which in turn can be in communication with a satellite which can be in communication with a land-based facility. This communication chain is exemplary only, and other communication chains can be utilized.

The AUV 2 is fitted with a pylon 6 that contains a 3D laser system for conducting 3D laser inspections of an underwater structure. The AUV 2 can be any underwater vehicle configured for conducting underwater travel and operations and that can support the 3D laser system. In one non-limiting example, an AUV with a pylon that can accommodate the 3D laser system is the Marlin® AUV available from Lockheed Martin Corporation of Bethesda, Md. The 3D laser system is not limited to being within the pylon 6 and is not limited to being located within the AUV 2. Rather, the 3D laser system can be mounted at any suitable location on the AUV 2 including on the outside of the AUV 2.

The AUV can use any suitable 3D laser system. In one non-limiting example, the 3D laser system that is used can be based on the Depth Perception 3D laser produced by 3D At Depth, LLC of Boulder, Colo. The Depth Perception 3D laser provides survey quality 3D data collection at depths up to 3000 meters. The Depth Perception laser includes a pulsed laser, laser receiver electronics (e.g. a means for detecting reflected light such as a photodector) and processing software and algorithms.

Although an AUV is described herein and shown in the illustrated embodiment, the 3D laser system can be mounted on other underwater platforms including but not limited to other self-propelled platforms such as an ROV, or non-self-propelled platforms such as a tripod.

The AUV 2 and supporting subsystems such as the surface ship and/or the land-based facility can be provided with the following functions and capabilities, singly or in any combination.

The AUV performs general 3D mapping and inspection.

The AUV performs close in inspection and measurement.

The surface ship and/or other support subsystem(s) can display the operational status of a forward looking sonar, a 3D sonar, the 3D laser and a still picture camera on the AUV.

The surface ship and/or other support subsystem(s) can allow the operator of the AUV to command operation of the 3D laser including, but not limited to, a continuous scan mode, a full scan mode, or a bowtie scan mode.

The surface ship and/or other support subsystem(s) can be capable of generating a multi-resolution model, where different sections of the model have different resolutions, depending on whether sonar, laser or a fused, optimized data set is available for that section of the model.

The AUV can be capable of statistical performance detection of positive anomalies (i.e. structures that are not expected based on a preexisting model but which appear in the generated data) not surrounded by existing structure, that are of a predetermined size or larger at a range of a predetermined distance.

The AUV can be capable of statistical performance detection of negative anomalies (i.e. structures that appear on the preexisting model but that do not appear in the generated data) not surrounded by existing structure, that are of a predetermined size or larger at a range of a predetermined distance.

The AUV can be capable of statistical performance detection of positive anomalies near existing structure of a predetermined size at a range of a predetermined distance.

The AUV can be capable of statistical performance detection of negative anomalies near existing structure of a predetermined size at a range of a predetermined distance.

Once anomalies have been identified from the 3D mapping scan, the AUV can autonomously or under command from a supporting subsystem re-plan a path to revisit these areas at a stand-off distance appropriate for the collection of high-definition optical imagery.

In one exemplary embodiment, no processing of the laser data will occur while the AUV is in the water. In this example, the raw sensor data will be stored and processed into point clouds by a supporting subsystem, for example a host surface ship or a land-based facility. The point clouds can then be post processed for the 3D virtual model build. If real-time analysis of the laser data is desired, then real-time processing of the laser data can occur on the AUV.

The AUV can be configured to autonomously perform an inspection sortie of a subsurface structure, detecting and reporting structural anomalies and collecting detailed inspection data for analysis. Depending upon the underwater structure to be inspected, the AUV can be provided with a suitable inspection package to permit the inspection.

Figure 2:
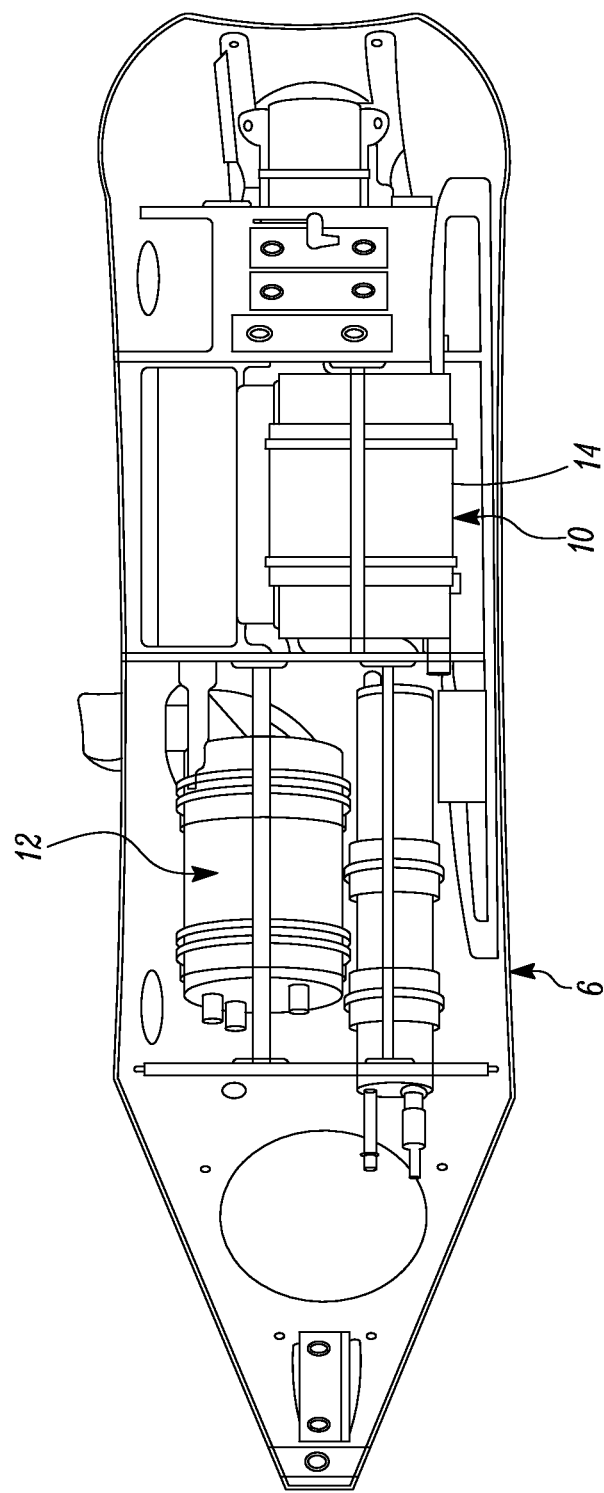
FIG. 2 is a top view of the AUV pylon removed from the AUV showing the arrangement of the 3D laser in the pylon.
Figure 3:
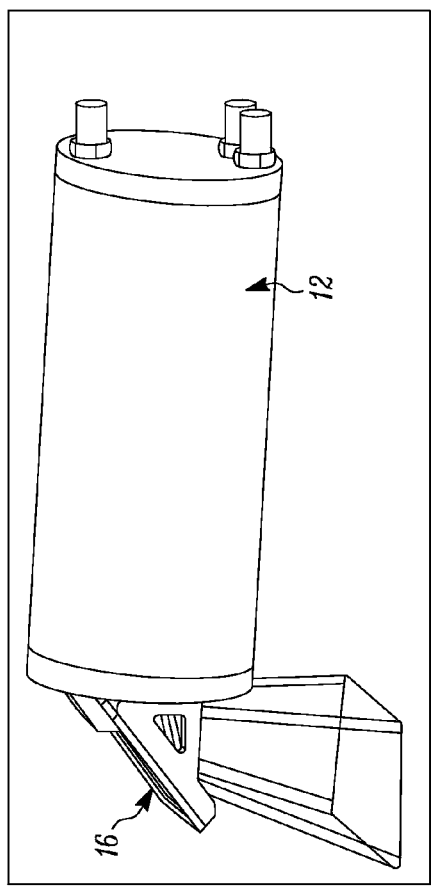
FIG. 3 shows the pressure vessel for the optics of the 3D laser.
Figure 4:
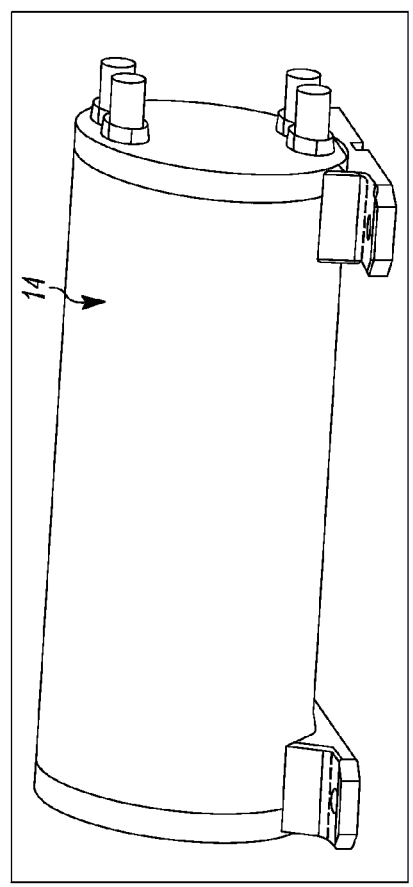
FIG. 4 shows the pressure vessel for the electronics controlling the 3D laser.

With reference to FIGS. 2-4, the pylon 6 contains the 3D laser system 10 therein. In the illustrated example, the electronics and optics of the 3D laser system 10 can be split into two separate enclosures including an optics pressure vessel enclosure 12 containing the optics for the 3D laser, including the laser emitter and the reflected light detector, and an electronics pressure vessel enclosure 14 containing the electronics for operating and controlling the laser.

Figure 5:
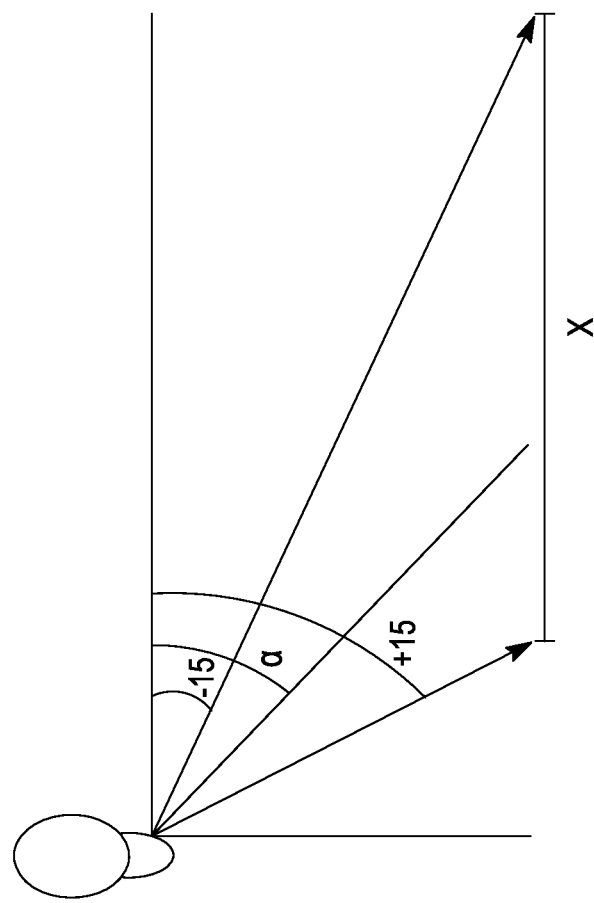
FIG. 5 is a front view of the AUV showing orientation of the 3D laser.

The laser can be mounted at any axial sensor angle per operational scenario. In one embodiment, the laser of the optics enclosure 12 can be mounted at a side look-down angle α of approximately 45 degrees as shown in FIG. 5. Such a side-look angle will provide good coverage of vertical and horizontal aspects of the area of interest. The laser is illustrated as being mounted so as to point portside, but it could be mounted so as to look starboard, forward, aft, downward or upward.

In one embodiment, motorized control of the laser mount angle can be provided. With reference to FIG. 3, the optics enclosure 12 contains a steerable mirror assembly 16 which provides off axis pointing of the laser beam. In one example illustrated in FIG. 5, the turn down assembly 16 can provide a vertical raster scan providing a resultant window of operation X of, for example, about 15 degrees perpendicular to the enclosure, and, a forward raster scan of for example, about 0 to 15 degrees axial to the enclosure. Both the forward and vertical scanner operations can be fully programmable to meet varying operational modes.

In one embodiment, the 3D laser 10 can have one or more of the following:

"side look" capability.
an Ethernet Application Programmable Interface (API) to allow the sensor to be used as a stand-alone unit or "black box".
up to about 300 meter depth capability
able to be operated in Eye Safe mode
include safety interlocks to ensure safe operation at all times.
electrical noise shall be minimized and signal integrity maintained.
spot coverage sufficient for varying AUV speed, range and scanner configurations.

With reference to FIG. 4, the electronics enclosure 14 provides power and communication interfaces with the AUV 2 and also interfaces with the optics enclosure 12.

The 3D laser 10 can be controlled to any suitable mode of operation including, but not limited to, the three following exemplary modes of operation:

Continuous Scan Mode
Bowtie Mode
Full Scan Mode

An Ethernet Application Programming Interface (API) will allow the scanning modes to be adjusted.

Figure 6:
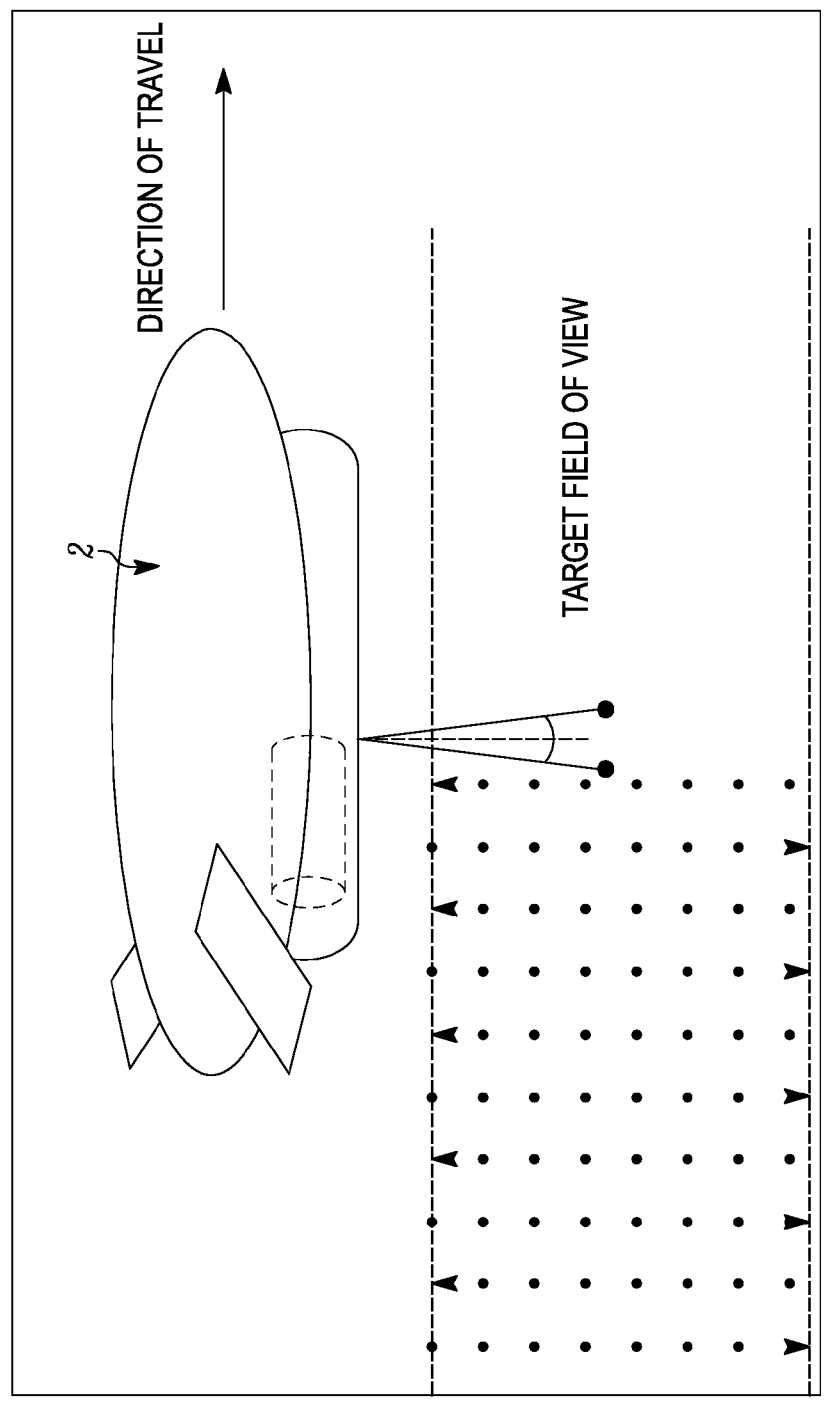
FIG. 6 illustrates operation of the 3D laser in a continuous line scan mode.

With reference to FIG. 6, the continuous scan mode provides fully programmable, line scan, vertical scanning operation utilizing the forward motion of the AUV 2. In the continuous scan mode, laser return data generated by the laser light that is reflected by the portion of the underwater structure being inspected is transferred from the electronics to the host processor after each scan line. This is referred to as re-arm time. A slight forward track correction per vertical scan line can be applied to provide a nearly vertical scan pattern to yield a more symmetric overall scan pattern. FIG. 6 illustrates the continuous scan mode for a vertical target.

Figure 7:
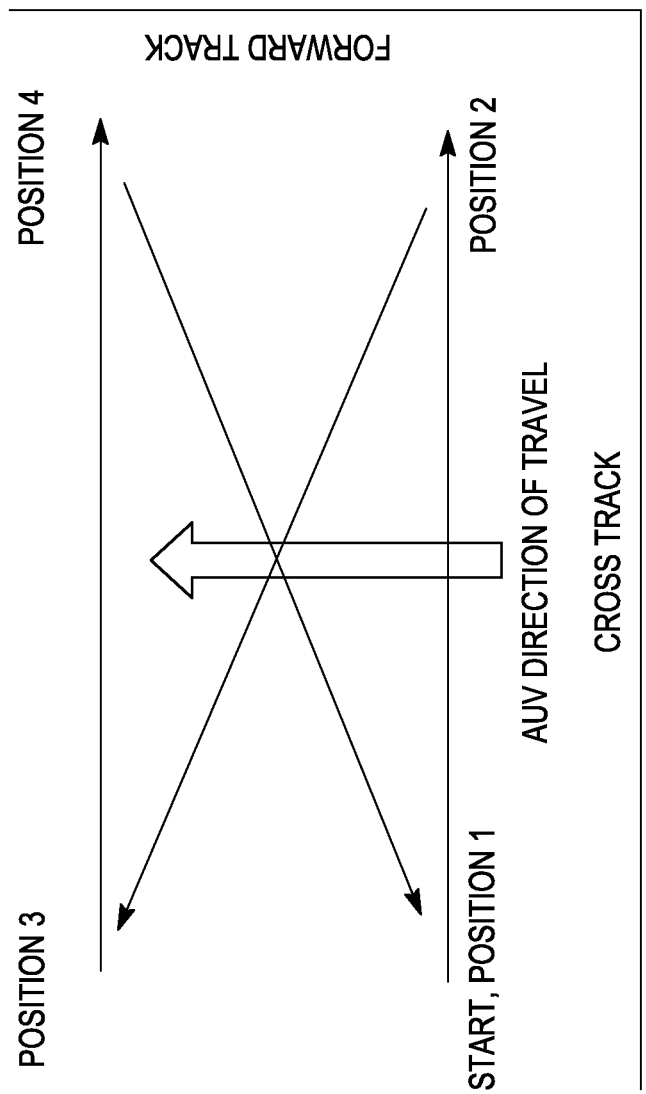
FIG. 7 illustrates operation of the 3D laser in a bowtie mode.

With reference to FIG. 7, a bowtie scan mode is illustrated that is an adaptation of the continuous scan mode. The bowtie scan mode provides fully programmable, line scan operation with interlaced forward pointing. This mode provides fast scanning and full field of view operation which is useful as a navigational aid. As depicted in FIG. 7, the laser beam is swept thru a "bowtie" pattern starting from position 1 and moving generally transverse to the direction of travel of the AUV to position 2. From position 2 the laser beam sweeps at an angle to position 3, followed by a transverse sweep from position 3 to position 4, finished by an angled sweep from position 4 back to position 1. The characteristics of the bowtie pattern can be fully programmable, and in one embodiment, each of the four sweep segments contains an equal number of laser pulses.

Figure 9:
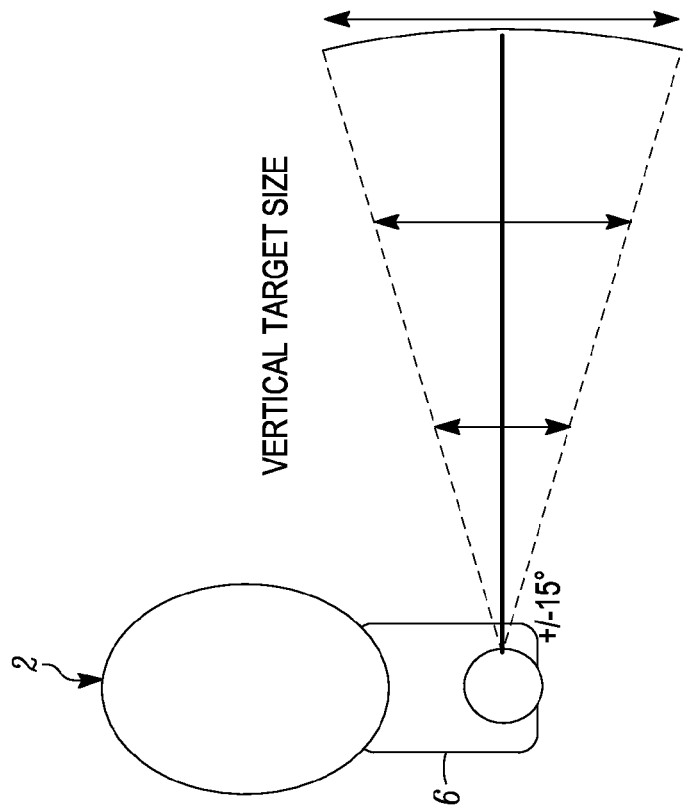
FIG. 9 is a front view of the AUV illustrating operation in the full scan mode.
Figure 8:
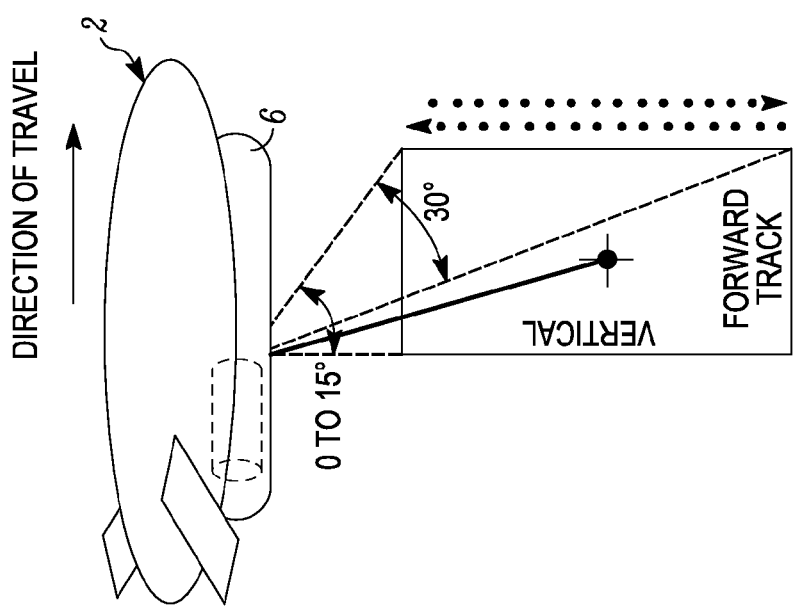
FIG. 8 is a side view of the AUV illustrating operation of the 3D laser in a full scan mode.
Figure 10:
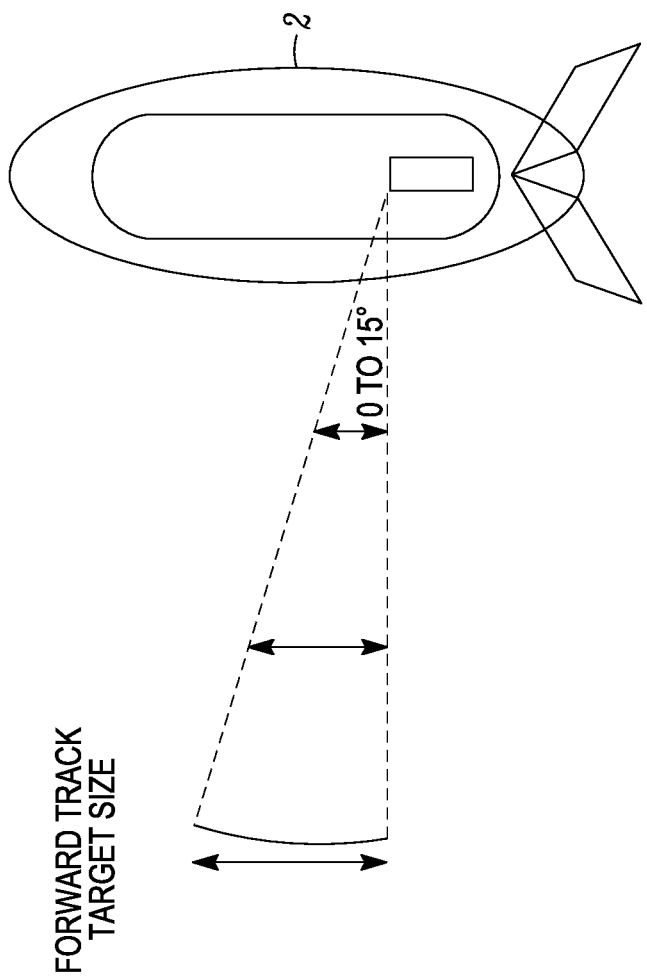
FIG. 10 is a top view of the AUV showing a forward looking view in the full scan mode.
Figure 11:
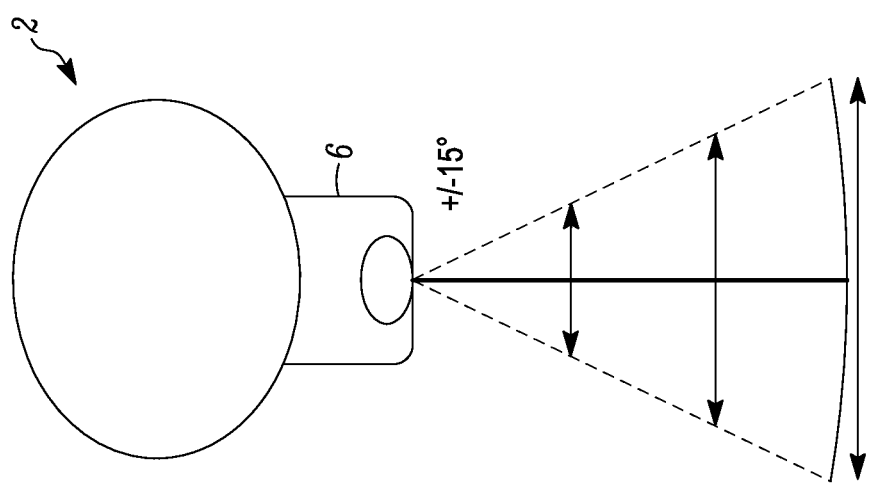
FIG. 11 is a front view of the AUV demonstrating an orientation for conducting a pipeline inspection.

With reference to FIGS. 8-10, a full scan mode is illustrated that functions similar to the continuous scan mode. However, in the full scan mode, the forward track angle is stepped between vertical passes to capture high detail of a given target, or to quickly capture a larger field of view. The re-arm operation occurs after the complete scan instead of after each vertical pass as in the continuous scan mode. In the full scan mode, the forward track scan angle θ can be stepped from, for example, about 0 to 15 degrees. The full scan mode is fully programmable for scan rates and forward and vertical coverage angles. Although labeled "vertical" for a side scan orientation, the raster scan motion is still considered "cross track". The laser could be mounted looking down or at a rotated orientation depending on the target of interest. In addition, motorized movement of sensor per application for immediate adjustment and target coverage can also be provided.

As indicated above, using the whole field of view of the sensor provides better coverage of the target surface. It was determined that the scan pattern had no effect on the residual point cloud error. It is preferred that the scan pattern selected should use both extremes of the field of view, provide a high data rate, and provide an even sampling of the structure at typical operating range and velocity. In order to get the highest data rate possible, downtime between scan lines should be minimized. In order to scan one side of the field of view and then the other with minimal downtime, diagonal scan lines can be used. Based on these factors it has been determined that in many instances the bowtie scan pattern may be the preferred scan pattern.

Communication packets for command and control can be sent and received from the laser 10 via, for example, the TCP/IP Ethernet Protocol. The laser can be configured with a static IP address for its network connections. The laser can provide a command acknowledge response packet for specific commands, referred to as telemetry. In addition, the laser can provide "housekeeping" telemetry packets at a regular interval to describe the current operating state of the laser. Environmental information can also be transmitted to the laser for laser range accuracy and determination of safe operating conditions for the laser. In addition, time synchronization can be employed between the AUV and the laser. Time synchronization is utilized in order to synchronize current laser pointing and range information with current position and orientation of the AUV.

Figure 12:
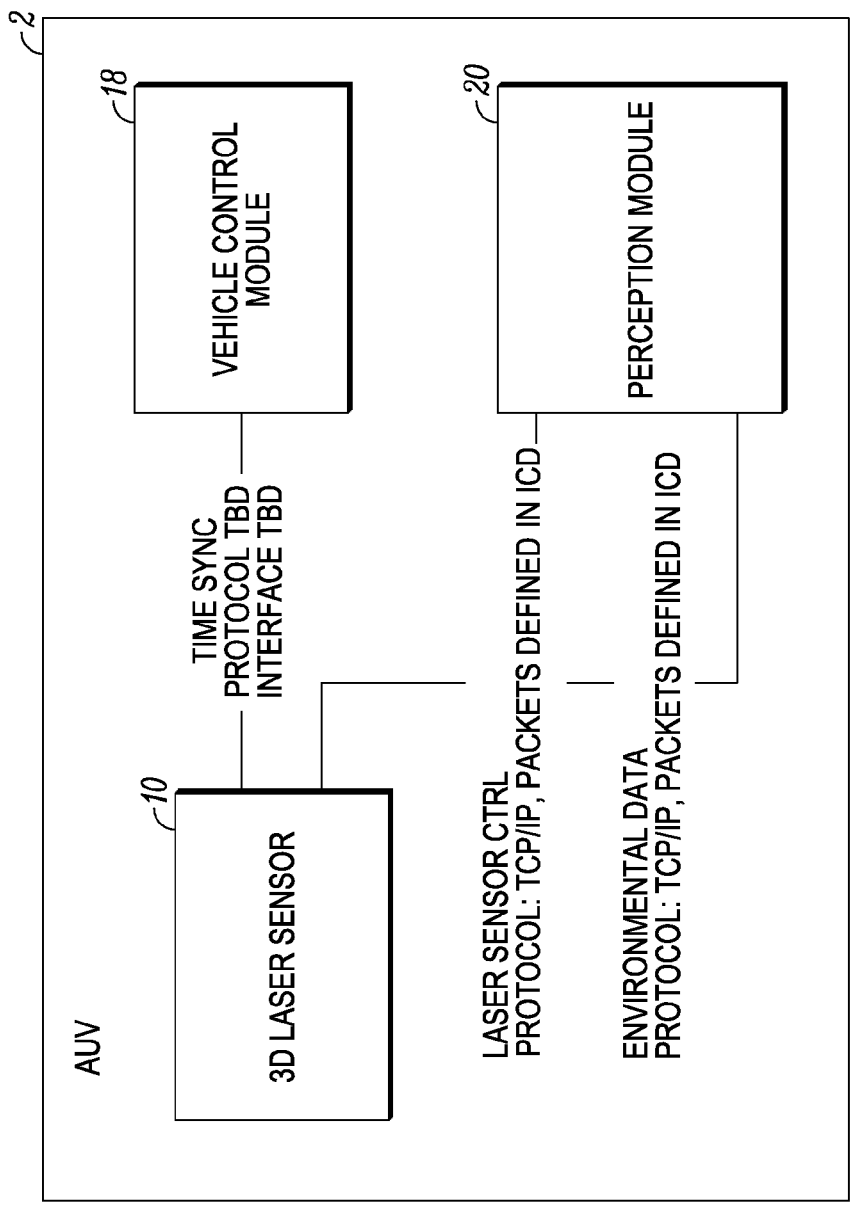
FIG. 12 illustrates exemplary interfaces between the 3D laser and other subsystems on the AUV.

FIG. 12 illustrates exemplary interfaces between the 3D laser 10 and other subsystems on the AUV. For example, time synchronization signals, laser power control, and other signals can be communicated between the laser 10 and an AUV control module 18, while laser control signals and environmental data signals can be communicated between the laser 10 and an AUV perception module 20.

The laser can communicate with the AUV modules 18, 20 through, for example, Ethernet packets. All command and telemetry packets can include a packet header and packet data. A command packet is generated on the AUV 2 and sent to the laser 10 through the TCP/IP interface. The laser will respond to all command packets with a response telemetry packet describing pass/fail status of the command.

A telemetry packet is generated on the laser 10 and sent to the AUV modules 18, through the TCP/IP interface. Some telemetry packets will be issued in response to commands, and others, such as housekeeping packets, will be sent at a regular interval.

When constructing 3D virtual models, the following error sources should be minimized:
  Sensor noise (azimuth, elevation, and range noise)
  Salinity and temperature gradients
  Time synchronization error between the 3D laser system and the AUV navigation system
  Navigation errors
  Calibration error
  3D model representation error (can be made negligible)

Separate missions have different initial position errors due to GPS error. The difference between two missions can easily be a few meters. Alignment of the datasets to each other is required for automated change detection.

A time synchronization approach between the 3D laser system and the navigation system of the AUV can also be selected that will keep the timing error under, for example, 1 ms. Conventional time synchronization techniques can be used to achieve the synchronization.

Calibration error is the error in the measurement of the pose of the 3D laser system relative to the pose of the navigation system. To reduce calibration error, offline (dry land) and online calibration measurement approaches were compared. The online alignment approach is believed to be preferred as it eliminates any error introduced by physical misalignment after the one-time offline alignment.

With reference to FIGS. 13A-C, scanning over the full range of azimuths maximizes the area sensed. FIG. 13A illustrates the coverage area when scanning the object at a single azimuth. FIG. 13B illustrates the coverage area when scanning at a full range of azimuths. Even further coverage is provided when scanning over the full range of azimuths at the corners of the structure, as shown in FIG. 13C.

3D Virtual Model Building of a Subsea Structure in Real-Time Using the AUV Configured with LADAR Building a model of an underwater structure from 3D laser data requires knowledge of the sensor position and orientation at the time of each laser pulse. Prior disclosures have addressed the problem of position and orientation estimation relative to an existing model using sonar data. However, if there is no existing model, that approach cannot be used. The difficult problem is position and orientation estimation without an existing model or accurate localization/navigation/pose information, followed by construction of a 3D model of the underwater structure. This problem is often called Simultaneous Localization and Mapping (SLAM).

The approach described herein uses a 3D laser which produces a single data point for each laser pulse, which data points are then combined to produce a full depth image. No a priori 3D model is required by the disclosed approach. The approach matches to the model being built rather than to a prior model, and provides simultaneous localization and mapping from 3D laser data derived directly from the environment. In an alternative embodiment, a 3D laser system that produces multiple data points from a single laser pulse, for example a flash LADAR system, could be used.

This problem has been addressed in many sensors including sonar and images. In sonar it has been used in bathymetric applications rather than in applications of modeling complex 3D structures. Approaches using bathymetric sonar use 2.5D matching approaches that match patches of sonar data together to align multiple passes. This approach does not work on complex 3D structures such as oil rigs or piers with lots of depth variation in the sonar data.

FIG. 14 shows a flow diagram of one embodiment of a method 30 for building a 3D virtual model of an existing underwater structure. In general, the method is carried out by using an underwater vehicle's inertial navigation capability along with a feature based sensor, e.g. 3D laser sensor, and a processor that generates a virtual alignment model or virtual working model of the underwater structure. Newly obtained data from subsequent laser pulses is aligned to the alignment model. The working model is updated and referenced when new data is obtained, thus building the 3D virtual model of the underwater structure. In many circumstances, the model building can be performed onboard the underwater vehicle and in real time. For example, the process of sending out a 3D laser pulse, receiving data from it, filtering the data, and aligning it 40 to the prior model may be completed in about one second or less. In other embodiments, the model building is performed remote from the underwater vehicle, for example on a host surface ship or in a land-based facility.

The method 30 includes directing laser pulses toward an underwater structure so that they impinge on a portion of the structure. Light reflected from the structure is detected 32, generating data point clouds 34. The point clouds are processed to generate a 3D image, i.e. the laser is a 3D laser. The 3D laser can be any 3D laser that can create a 3D image from the reflected light of one or more transmitted light pulses. An example of a suitable 3D laser is the Depth Perception 3D laser produced by 3D At Depth, LLC of Boulder, Colo. However, as indicated above, a flash LADAR system could also be used. It will be appreciated that the 3D laser can be arranged such that it points toward an underwater structure so that it can send laser pulse at the underwater structure and can be oriented at various desired angles as discussed above and distances from the underwater structure.

It will be appreciated that inertial navigation systems are known, and are used to determine the position, orientation, and velocity (e.g. direction and speed of movement) of the underwater vehicle. An inertial navigation system can include a Doppler velocity log (DVL) unit that faces downward for use in determining velocity, but it will be appreciated that an inertial navigation system can be any system that can determine position, orientation, and velocity (e.g. direction and speed of movement). An example of a suitable inertial navigation system is the SEA DeVil available from Kearfott Corporation.

Once the reflected light is detected by the light detector of the 3D laser, data points are obtained 34 which are suitable for forming a scanned 3D virtual model of the underwater structure. The data points are then used to generate a working virtual alignment model 36, which will be used in alignment of subsequent 3D models as the pre-existing 3D model of the underwater structure. Additional data is collected 38 by repeating steps 32 and 34, and new data points are obtained which are aligned 40 and added 42 to the virtual alignment model.

With reference to the alignment step 40, in one embodiment the additional data points are aligned with the virtual alignment model by an iterative process of fitting the data with the alignment model. In some embodiments, this iterative process is based on data from multiple 3D laser pulses. By aligning the new data to the alignment model and adding the aligned data to the alignment model, the 3D virtual model of the underwater structure is built 42. As the virtual alignment model is a virtual working model of the 3D underwater structure, the virtual model being created with new incoming data is used to update the alignment model, so it can be used to align to additional collected data.

FIG. 15 is a flow diagram of one embodiment for processing the data points and position orientation (pose) information for building the 3D virtual model of the underwater structure. Data 100 is retrieved by a suitable light sensor, which produces for each transmitted laser pulse a 3D image, also called a point cloud 110, that is sent to an alignment block 140. At an initial stage, the alignment model (Alignment Model 144) is empty, so the initial data collected is used to produce an initial alignment model. As additional data is collected, it is aligned 140 with the Alignment Model 144, using an iterative process, which is further described in FIGS. 19 and 20. It will be appreciated that the alignment block 140 obtains an initial pose estimate from a Loop Closure 300.

As additional data is collected, the Point Clouds 110 are Aligned 140 to the Alignment Model 144 and Transformed 152 by the Refined Pose computed by the align block 140. The Transform 152 block may be the same as that shown in FIG. 16 (further described below). It will be appreciated that the Transform 152 block can use the Refined Pose to transform data points such that they are aligned with the Alignment Model 144, and that the blocks 152 in FIGS. 15 and 16 may have different pose inputs, but the function of the blocks is the same. The Transformed 152 point clouds can also be stored in the Point Cloud Archive 320, which is a data storage. During the alignment, blocks 140, 152, and 144 represent an iterative looping process (see FIGS. 16 and 17), which aligns and fits the new data with the Alignment Model 144.

The Loop Closure 300 receives for each incoming data Point Cloud 110 an estimated pose from the Filter 312 and, by referencing the Alignment Model 144, the Loop Closure Needed block 302 determines whether the 3D model from the incoming data Point Cloud 110 overlaps a portion of the Alignment Model. Match 306 block then matches these features and computes the pose correction required to bring the two segments into alignment. A Correct Poses 308 block checks to see if this pose correction is above a threshold, and if it is not, sends the pose estimate to the Align 140 block. If the pose correction is above a threshold, the Correct Poses 308 block identifies the portion of the model that needs to be adjusted to bring the two existing model portions into alignment, estimates the pose adjustments that will bring them into alignment, and sends this information to a Rebuild Model Segment 310 block which recomputes the portion of the model that needs to be adjusted using the corrected poses from the Correct Poses 308 block and point clouds from the Point Cloud Archive 320. The Correct Poses 308 block then passes the adjusted estimated pose to the align 140 block which aligns the new 3D model to the newly adjusted Alignment Model. It will be appreciated that the model feature extraction 304 block and the match 306 block functions of the loop closure 300 may be based on the align 140 block described in FIG. 16.

As shown, the Filter 312 receives position and orientation estimates, for example from a navigation system, such as an inertial navigation system as well as the refined poses from the Align 140 block. The Filter 312 maintains an estimate of the vehicle State 316 (pose and its derivatives) and uses these to Predict 318 the pose of the laser at the times the laser produces data. An Update 314 block fuses pose estimates from navigation and from the Align 140 block to update the State 316. It is to be appreciated that one possible implementation of the Filter 312 is a Kalman filter, which is well known.

With reference to the arrow leading from the Filter 312 to the Loop Closure 300, it will be appreciated that because alignment occurs with respect to the model being built, the error in each alignment can have a tendency to accumulate over time, which may cause significant error in the Alignment Model. The Loop Closure is a process that recognizes when an area that has been seen before is being observed, and uses an alternate alignment process to reduce this error. The pose computed by Predict Pose 318 is used in order to determine whether it is an appropriate time to apply the loop closure process.

In generating the Alignment Model 144 and its subsequent use in building a 3D model of the underwater structure, it will be appreciated that data from multiple laser pulses from the 3D laser can be collected. The information from these pulses is turned into multiple samples of new data points which are aligned with the Alignment Model. It will be appreciated that the new data points and each sample can represent a different viewpoint of an area inspected by the 3D laser. It will also be appreciated that the samples can substantially overlap in most areas so there is a significant redundancy in the 3D data in the Alignment Model. Such multiple and redundant sampling as well as samples of overlapping views can help increase the confidence and viability of the model built.

Details of Alignment and Fit Processing

With further reference to the details of the alignment processing, FIGS. 16 and 17 show flow diagrams of one embodiment of aligning information from collected data points to the Alignment Model. Generally, in the embodiment shown, a sample of new data points obtained is aligned to the Alignment Model. As shown, the step of aligning includes an iterative method of repeatedly performing a fit processing based on multiple samples of the data points, which is further described below, and where the fit processing includes adjusting the data points sampled to match with the Alignment Model of the 3D underwater structure. Generally, alignment and fit processing includes estimating the pose of the 3D laser to align the new data with the previous data stored in the model.

With reference to FIG. 16, the reflected light from the 3D laser provides the point clouds 110 (see also FIG. 15) used to perform the alignment process. The point clouds 110 include data points which represent a 3D model of the underwater structure. Due to a usual high level of noise and potential non-useful information that is known to occur, the data points in some circumstances are filtered 142 before undergoing alignment.

FIG. 17 shows a flow diagram of one embodiment of the filtering process 142, which may be included as part of the step of obtaining the data points 34 shown in FIG. 14. The filtering process 142 includes filtering the detected light resulting from the laser light impinging on the underwater structure so as to obtain data points that are used during alignment. The data from the point cloud 110 can be input through a series of data processing and filtering steps, which result in a filtered point cloud 160. In the embodiment shown, the point cloud 110 can be input to an Intensity Threshold filter 162. Generally, the filtering process 142 can perform morphological operations on the point cloud 110. For example, a Morphological Erode of Each Range Bin 164 can be performed, and then Adjacent Range Bins 166 are combined. Box 164 and 166 represent non-limiting examples of certain morphological operations that can be used by the filtering process 142. Next, a Non-maximum Suppression 168 step can be performed before the filtered point cloud 160 is obtained.

With further reference to FIG. 16, the filtered point cloud 160 proceeds to a processing loop 144. In one embodiment, the processing loop 144 is a RANSAC (random sample consensus) loop which is an iterative method to estimate parameters of a mathematical model from a set of observed data which contains "outliers". For example, the loop 144 represents a non-deterministic algorithm in the sense that it produces a reasonable result with a certain probability, and where the probability can increase as more iterations are performed.

In this case, the parameters of the mathematical model are the position and orientation (pose) of the 3D laser relative to the pre-existing model of the underwater structure, and the observed data are the data points from the laser. A basic assumption is that the observed data consists of "inliers", i.e., data that can be explained by the mathematical model with some pose parameters, and "outliers" which are data that cannot be thus explained. As a pre-existing 3D model is available in the method herein, such an iterative process, given a small set of inliers can be used to estimate the parameters of a pose by computing a pose that fits the data (i.e. 3D laser data points) optimally to their corresponding closest model points.

As shown in FIG. 15, the processing loop 144 can include processing functions Transform 152, Random Sample 154, and Fit 156. In the Transform 152 portion, the point clouds undergo transformation to a coordinate system specified by the initial pose 130 that brings them into approximate alignment with the pre-existing 3D model.

As further shown in FIG. 16, an initial pose 130 is input into the Transform 152 portion. In some instances, the initial pose 130 represents the position and orientation from an underwater vehicle's inertial navigation system. In subsequent iterations, the initial pose can be the result from updated knowledge of the first or any preceding alignment that has occurred, while undergoing the procedure shown by FIG. 16. It will be appreciated that a preceding alignment can be appropriately adjusted based on other measurements, such as inertial velocity or acceleration and other inputs from the underwater vehicle's inertial navigation system.

With reference to the available pre-existing 3D model, also called the Alignment Model, the pre-existing 3D model can be input to the diagram at 146, 156 and 150, and further described as follows.

In the Random Sample 154 portion of the loop 144, a sample of the points from the point cloud is obtained for further processing and comparison with the pre-existing 3D model. The Fit 156 portion of the loop 144 is where the points sampled from Random Sample 154 are adjusted to line up with the pre-existing 3D model. That is, the collective position (pose) of the 3D laser data, e.g. data points, is rigidly adjusted to align the points with the pre-existing 3D model. In the Fit 156 portion, the data points can undergo one or more closest point calculations to determine the closest point on the model. The data points and the closest point on the model for each data point are used to compute the correction to the initial pose 130 that optimally aligns the data points and closest points on the model for each data point.

As described, the alignment process is an iterative method to determine a correction to the initial pose 130 that aligns as many points of the data as possible (the inliers) with the pre-existing 3D model. In some embodiments, this is achieved from a single laser pulse from the 3D laser, for example data points from a single laser pulse, from which the data point samples are taken. It will also be appreciated that multiple laser pulses of the 3D laser may be employed as needed.

Thus, it will be appreciated that the functions Transform 152, Random Sample 154, and Fit 156 are configured as a loop 144 that can be repeated 144a as necessary to raise the confidence that the best alignment of the data with the pre-existing 3D model found in these iterations is truly the best possible alignment. The step of aligning in many embodiments includes repeatedly performing a fit processing based on multiple samples of the data points or data points from multiple laser pulses, where the fit processing includes adjusting the data points sampled to align with the pre-existing 3D model of the underwater structure. It will be appreciated that in appropriate circumstances, the multiple samples of data points or data points from multiple laser pulses that go through the loop 144a can often have overlapping data points, where such overlap can further help increase the probability of finding the best possible alignment of the data points with the model.

That is, the fit is done using a subsample of the data points. Fit uses these points to estimate the pose of the sensor relative to the model. This estimated transfoiln is applied to all data points. The transformed points are then compared to the pre-existing model to determine how well the data matches.

It will also be appreciated that the number of iterations that is appropriate and the amount of overlap used to carry out the alignment and fit can depend upon a balance of several factors. Some factors can include, but are not limited to for example, the amount of processing power employed, how much time is used to collect data, reliability of the data collected and the Alignment Model, how the underwater vehicle is moving, and the complexity of the underwater structure. Where more than one 3D laser pulse is employed, other factors such as for example, the pulse rate of the 3D laser, the potential increase in the initial pose 130 error over time, and the accuracy of the model can be considered in determining how many iterations of the alignment process are needed.

After many random samples of data points have been fitted, a number of solutions can be obtained. FIG. 16 shows portions Order Solutions by Error 146 and Find Best Solution 148. The solutions provided by the loop 144a are ordered (e.g. at 146) so that the best solution can be obtained (e.g. at 148). Once the best solution is obtained, the closest points on the pre-existing 3D model to each of the inliers of this solution are determined, and the correction to the initial pose that best aligns these inliers with the closest points is computed at Fit w/Inliers 150. The updated pose is sent, for example, back to the underwater vehicle's inertial navigation system.

It will be appreciated that the methods of building a 3D model of the underwater structure herein may be provided in an autonomous system onboard an underwater vehicle. In some embodiments, the underwater vehicle is an autonomous underwater vehicle (AUV) with the appropriate processing capability to build a model in real time. However, it will be appreciated that the system may be wholly or partially onboard other vehicles, such as for example an ROV or a manned sea vessel.

In one embodiment, the system includes a 3D laser sensor and an inertial navigation system, along with suitable processing capability to carry out model building of underwater structures.

FIG. 18 schematically depicts an example configuration of the AUV 2 for building the 3D model of the underwater structure. In one embodiment, the AUV includes the 3D laser sensor 10 and an inertial navigation system, along with suitable processing capability to carry out the model building.

In the embodiment shown, the 3D laser sensor 10 detects light that is reflected by the underwater structure of interest, and transmits gathered data to a data storage 220. A data processor 230 is configured to obtain the data points from the data storage 220. The data processor 230 can be, for example, any suitable processing unit. The data points are processed to generate the alignment model (e.g. Alignment Model 144) of the underwater structure based from the data points obtained. When additional data is collected by the sensor 10, this data is aligned to the alignment model to build the 3D model of the underwater structure.

For example, the processor 230 obtains new data points from the data storage 220 after additional data is collected by the sensor 10. As with the initial data points, the new data points are processed to provide a 3D model of the underwater structure. The processor 230 is configured to align a sample of the new data points obtained to the alignment model and, using the alignment techniques described, to build the 3D model of the underwater structure with the new data points.

It will be appreciated that the information obtained on the underwater structure can be used to update the vehicle navigation system 240 which is, for example, an inertial navigation system. It will be appreciated that the components of the system can be powered by the underwater vehicle.

The methods and systems described herein above can be used to build a 3D model of an existing underwater structure based on laser pulses from a 3D laser. Such applications can include, but are not limited to, subsea structure inspection and repair in both commercial and military settings, harbor inspection, and mine detection and/or countermeasures. In one embodiment, data from pulses of the 3D laser is collected, data from an inertial navigation system is collected, and the data is logged and processed to generate a 3D model of the scanned underwater structure, or alignment model. The alignment model is a working, virtual 3D model of the underwater structure to which further data can be aligned for change detection. The collection, logging and processing of the data can be performed using the data processing electronics onboard the underwater vehicle, with real time processing capability.

Such a method and system for model building as described herein can be useful when inspecting for damage, deformation of underwater structures. The methods and systems described herein above can be useful, for example, in situations where an underwater vehicle is far from the seafloor, for example over 1000 meters, such that other navigation tools, such as DVL are unavailable. It will be appreciated that no other feature based sensors are necessary and that navigation relative to non-stationary underwater structures may also be possible using the methods and systems herein. The use of a 3D laser allows scanning of complex 3D structures to provide a full six degrees of freedom in pose.

3D Model Building of an Underwater Structure in Real-Time Using the AUV Configured with Sonar and LADAR In a variation of the 3D virtual model building discussed above, 3D sonar and LADAR can be used. Building a model of an underwater structure from 3D sonar and 3D laser data requires knowledge of the sensor positions and orientations at the time of each sonar ping and laser pulse.

The sonar produces a relatively low resolution depth image for each sonar ping. This depth image is used as an estimate for the initial alignment for the laser depth image, which has higher resolution than the sonar. WO 2012/061137 discloses building a 3D virtual model using a 3D sonar.

This embodiment reduces search time, improves alignment reliability, and produces a multi-resolution model that reflects the resolution of the data available on each model region. This embodiment provides simultaneous localization and mapping from sonar and laser data derived directly from the environment.

3D modeling has been addressed in many sensors, including sonar and images, but not with the use of two 3D sensors of very different resolutions and coverage such as 3D sonar and 3D laser. In sonar it has been used in bathymetric applications rather than in applications of modeling structures. Approaches using bathymetric sonar use 2.5D matching approaches that match patches of sonar data together to align multiple passes. However, that technique does not work on complex 3D structure such as oil rigs or piers with lots of depth variation in the sonar data.

In one embodiment, data from the 3D laser and the 3D sonar can be fused together to construct a single virtual model from the data. In another embodiment, a virtual model from the 3D laser data can be constructed, and a virtual model from the 3D sonar can be constructed, with the two models then being combined to create a single virtual model.

No a priori 3D model is required, and it produces a multi-resolution model that reflects the resolution of the data available on each model region.

3D Model Building of an Underwater Structure in Real-Time Using the AUV Configured with Scanning LADAR In a variation of the 3D virtual model building discussed above, a scanning 3D laser can be used. A scanning 3D laser produces a single range return for a single laser pulse, with the returns from many pulses being combined to produce a complete scan. This technique compensates for sensor pose changes that may occur between each scan by aligning all the scans first at a coarse level then at a finer level based on matching the structure in the scans. This technique compensates for sensor pose changes that may occur between each pulse by correcting their position based on the pose estimates from an inertial navigation unit. This technique provides simultaneous localization and mapping from scanning LADAR derived directly from the environment.

This embodiment explicitly addresses the issue of compensating for motion of the sensor during the sensor scan, including errors in the poses provided by the inertial navigation unit.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:
1. A method comprising:
   directing at least one laser beam pulse from a laser that is mounted on a moving underwater vehicle toward an underwater structure while the vehicle is at a first location relative to the underwater structure;
   detecting light that is reflected from the underwater structure using a light detector mounted on the underwater vehicle;
   generating a first data point cloud from the detected light autonomously in real time, the first data point cloud being suitable for generating a three-dimensional model of the underwater structure;
   generating a virtual alignment model autonomously in real time of the underwater structure from the first data point cloud;
   while generating the virtual alignment model autonomously in real time of the underwater structure from the first point cloud data, moving the underwater vehicle from the first location to a second location relative to the underwater structure;
   directing one or more additional laser beam pulses from the laser that is mounted on the moving underwater vehicle toward the underwater structure while the vehicle is at the second location relative to the underwater structure;
   detecting light that is reflected from the underwater structure from the one or more additional laser beam pulses using the light detector and generating a second data point cloud autonomously in real time;
   aligning a sample of the second data point cloud obtained to the virtual alignment model autonomously in real time; and building a three dimensional virtual model autonomously in real time of the underwater structure with the virtual alignment model and the sample of the second data point cloud.

2. The method of claim 1, wherein the moving underwater vehicle is one of an autonomous underwater vehicle, or a remotely operated vehicle.

3. The method of claim 1, further comprising filtering the first data point cloud and the second data point cloud autonomously in real time.

4. The method of claim 1, wherein aligning a sample comprises repeatedly performing autonomously in real time an iterative fit process, the iterative fit process comprises adjusting data point clouds sampled to match with the alignment model generated.

5. The method of claim 1, wherein generating an alignment model further comprises loop closure processing autonomously in real time of at least a first pass of the underwater structure, the loop closure configured to set an initial reference that minimizes error propagation.

6. The method of claim 1, wherein building the three dimensional model comprises aligning autonomously in real time multiple samples of additional data point clouds with the alignment model.

7. The method of claim 6, wherein each of the additional data point clouds represents data collected from a different viewpoint of an area of the underwater structure.

8. The method of claim 7, wherein at least some of the different viewpoints at least partially overlap with each other such that at least some of the data from the additional data point clouds overlap.

9. A system, comprising:
a moving underwater vehicle and a three-dimensional laser system mounted on the moving underwater vehicle, the laser system including a steerable laser for projecting a plurality of laser beam pulses toward an underwater structure and a light detector that detects light that is reflected from the underwater structure;
a point cloud data storage that is in communication with the laser system for storing point cloud data that is autonomously generated in real time by the laser system; and
a data processor in communication with the point cloud data storage that processes first point cloud data autonomously in real time from the data storage, the data processor is configured to generate a three dimensional virtual model from the first point cloud data autonomously in real time, and to align second point cloud data obtained while the first point cloud data is being processed by the data processor with the three dimensional virtual model.

10. The system of claim 9, wherein the data processor is configured to autonomously in real time generate a virtual alignment model, align a sample of a data point cloud obtained to the virtual alignment model autonomously in real time, and generate the three dimensional virtual model of the underwater structure autonomously in real time from the virtual alignment model and the sample of the data point cloud.

11. The system of claim 9, where the moving underwater vehicle is one of an autonomous underwater vehicle, or a remotely operated underwater vehicle.

12. The system of claim 9, wherein the underwater vehicle comprises an autonomous underwater vehicle or a remotely operated underwater vehicle, the point cloud data storage and the data processor are on the underwater vehicle, and the underwater vehicle further includes a vehicle navigation system in communication with the data processor.

13. The system of claim 9, wherein the data processor and/or the point cloud data storage are at one or more locations separate from the underwater vehicle.

* * * * *